United States Patent [19]
Griswold et al.

[11] Patent Number: 5,873,734
[45] Date of Patent: Feb. 23, 1999

[54] BIOMECHANICAL MODELS

[75] Inventors: Joseph G. Griswold, Wayne, N.J.; Daniel E. Lemons, Hastings-on-Hudson, N.Y.

[73] Assignee: The Science Learning Workshop, Inc., Hastings-on-Hudson, N.Y.

[21] Appl. No.: 866,657

[22] Filed: May 30, 1997

[51] Int. Cl.$^6$ .......................... G09B 23/30; G09B 23/28; G09B 23/08; G09B 2/30
[52] U.S. Cl. .................. 434/274; 434/267; 434/262; 434/302; 623/27; 623/57
[58] Field of Search .................. 434/274, 302, 434/267, 265, 275; 901/15, 50, 27; 623/40, 50, 51, 52, 57, 58, 59, 60

[56] References Cited

U.S. PATENT DOCUMENTS

| | | | |
|---|---|---|---|
| 2,537,551 | 10/1951 | Sansbury | 623/57 |
| 2,573,347 | 7/1951 | Mazzola | 623/50 |
| 4,000,564 | 1/1977 | Haffner et al. | 434/274 |
| 4,201,226 | 5/1980 | Phillips | 128/774 |
| 4,276,032 | 6/1981 | Woley et al. | 434/274 |
| 4,349,339 | 9/1982 | Daniel | 434/274 |
| 4,604,098 | 8/1986 | Seamone et al. | 623/60 |
| 4,850,877 | 7/1989 | Mason et al. | 434/274 |
| 5,044,960 | 9/1991 | De Porteous | 434/274 |
| 5,549,712 | 8/1996 | Gammer et al. | 623/60 |

FOREIGN PATENT DOCUMENTS 2204175  11/1988  United Kingdom ................. 434/274

OTHER PUBLICATIONS

Edmund Scientific's Co. Catalog, Jan. 1997, pp. 44–45.
10th Annual International Human Anatomy & Physiology Society Conference, Jun. 8–13, 1996.

*Primary Examiner*—Robert A. Hafer
*Assistant Examiner*—Michael Priddy
*Attorney, Agent, or Firm*—Todd E. Garabedian; Wiggin & Dana

[57] ABSTRACT

In one aspect, the present invention is directed to a kit for constructing a biomechanical model of a lever system selected from a first class lever system, a second class lever system, and a third class lever system, comprising a base, a support structure attachable to the base, at least one lever assembly attachable to the support structure, and at least one cord assembly attachable to the lever assembly. The present invention is also directed to first, second and third class lever system models useful for teaching and demonstration purposes.

23 Claims, 6 Drawing Sheets

BIOMECHANICAL MODELS

BACKGROUND OF THE INVENTION

1. Field of the Invention

The present invention relates to biomechanical models, and more particularly to kits for making biomechanical models of lever systems in the body, such as first, second, or third class lever systems, useful for teaching and demonstration purposes as well as complete models of first, second, and third class lever systems.

2. Brief Description of the Art

The study of anatomy, physiology, and kinesiology requires a thorough understanding of the skeletomuscular system. One educational approach to studying and learning the skeletomuscular system is to consider this system as a combination of levers (i.e., bones) and force generators (i.e., muscles) that act together to produce force that moves a resistance force(i.e., a weight). When muscles contract, force is usually applied to bones, resulting in movement or support of the bones. In the skeletomuscular system, the joints function as fulcrums, the bones function as levers, and the muscles produce the force that moves the levers and resistance. The arrangement of levers, resistance, fulcrums, and forces comprise three classes of lever systems depending on the relative position of the components.

In a Class I lever system (also known as a first class lever system), the fulcrum is located between the force and the resistance. An example of this type of lever system is a child's seesaw. The children alternate between being the resistance (weight) and the force across a fulcrum in the center of the seesaw board. An example of a first class lever system in the body is the head and neck. The joint in the neck is the fulcrum, the posterior neck muscles generate the force that pulls down the back of the head, and raises the face.

In a Class II lever system (also known as a second class lever system), the resistance is located between the fulcrum and the force. An example is a wheelbarrow where the wheel is the fulcrum and the person lifting on the handles provides the force. The load, or resistance, carried in the wheelbarrow is placed between the wheel and the operator. In the body, an example of a class II lever system is the foot and ankle when a person stands on his toes. The calf muscles act as force generators and pull the heel (end of the lever) to elevate the foot and the weight of the entire body, with the ball of the foot acting as the fulcrum.

The Class III lever system (also known as a third class lever system) is the most common type of lever system in the body. In this system, the force is located between the fulcrum and the resistance. An example is a person operating a shovel. The hand placed on the handle closest to the blade acts as the force to lift the resistance, such as a shovel full of dirt, and the hand placed near the end of the handle acts as the fulcrum. In the body, an example of a Class III lever system is the action of the biceps muscle (force generator) pulling on the forearm (lever) to flex the elbow (fulcrum) and elevate the hand (resistance).

Biomechanical engineering students, physical therapy students, medical students, allied health students, veterinary students, and sports medicine students must have a good working knowledge of the joints of the body and how they operate. However, learning the large number of muscles, bones, and joints and how they interact can be a difficult task. Various methods have been developed to assist students in learning the biomechanics of the human body. Textbooks, videos, and computer programs offer methods of teaching the interaction between the various components. However, each of these teaching methods has disadvantages.

In the case of textbooks, the motion of the lever systems and the relative placement of the bones and muscles as they move is difficult to S describe in words and diagrams, and the student is forced to view the three-dimensional movement of a lever system in a two-dimensional presentation. Thus, full appreciation of the actual biomechanics of the lever systems of the body is not possible with textual materials.

In the case of videos, motion of the lever systems can be demonstrated and viewed from multiple angles. However, the student does not have the opportunity to interact physically with the demonstration. For example, the student cannot apply resistance to the lever system and measure forces required to move that resistance. Like textual materials, full appreciation of the actual biomechanics of the lever systems in a video presentation is not possible.

Computer programs can offer animated simulations of lever system motion. In addition, some programs can offer application of "virtual resistance" to the animated lever system and demonstrate how that applied "virtual resistance" affects the force needed to move the lever system. However, the student never interacts with a physical object and thus cannot fully appreciate important details of the biomechanics of the lever systems.

Educational three-dimensional models are available for learning various organs of the human body. For example, models of the human brain, eye, ear, jaw, heart, lung, hand, foot, skull, skeleton, and tooth are available commercially. Anatomical models of various other species, such as dog and horse, are also available. However, while such models show anatomical relationships between various organs, they do not show the biomechanics of lever systems, nor do they demonstrate how resistances are handled by the lever systems. Models of human joints have been made with cardboard and rubber bands; however, such models are not suitable for repeated classroom demonstration use, nor are they designed to quantitatively measure the forces required for joint movement.

What is needed in the art is an interactive educational device that offers a three-dimensional demonstration of the various lever systems, as well as the capability to demonstrate both quantitatively and qualitatively how biomechanical variables affect the force required to move the lever system. The present invention provides an answer to that need.

SUMMARY OF THE INVENTION

In one aspect, the present invention is directed to a kit for constructing a biomechanical model of a lever system selected from a first class lever system, a second class lever system, and a third class lever system, comprising a base, a support structure attachable to the base, at least one lever assembly attachable to the support structure, and at least one cord assembly attachable to the lever assembly.

Another aspect of the present invention is directed to a biomechanical model of a third class lever system, comprising a base, a support structure attached to the base, a cord assembly, and a third class lever system assembly attached to the support structure. The third class lever system comprises an upper member positioned approximately parallel to the support structure, a lower member pivotably attached to the lower member such that one end of the lower member follows an arcuate path, and a pulley attached to the second end of the upper member. The cord assembly is attached to the lower member and threaded over the pulley, wherein pulling force applied to the cord assembly causes an end of the lower member to follow an arcuate path.

Another aspect of the present invention is directed to a biomechanical model of a second class lever system, comprising a base, a support structure attached to the base, a cord assembly, and a second class lever assembly attached to the support structure. The second class lever system comprises an upper member, a lower member pivotably attached to the upper member and a foot member, and the foot member pivotably attached to the base, and a pulley attached to the upper member. The cord assembly is attached to the foot member and threaded over the pulley, wherein pulling force applied to the cord assembly causes the wheels of the foot member to elevate with respect to the base.

Another aspect of the present invention is directed to a biomechanical model of a first class lever system, comprising a base, a support structure attached to the base, a cord assembly, and a first class lever assembly attached to the support structure. The first class lever system comprises a transverse member, an upright member pivotably attached to the upright member so that the transverse member moves in an arcuate path along a plane perpendicular to the base. The cord assembly is attached to the second end of the transverse member, wherein pulling force applied to the cord assembly causes an end of the transverse member to elevate with respect to the base.

DESCRIPTION OF THE FIGURES

The invention will be more fully understood from the following detailed description taken in conjunction with the accompanying drawings in which.

DETAILED DESCRIPTION OF THE INVENTION

Demonstration devices and materials have been developed which illustrate, in a qualitative way, the structural elements and principles of lever systems. However, devices which allow for quantitative investigation and manipulation of variables by students in learning the biomechanical elements and principles of the skeletomuscular system have not been previously available. The present invention is an educational device, in the form of a kit or completed functioning devices, that demonstrate the biomechanics of the various lever systems in the body and how manipulation of certain variables affect those biomechanics.

For convenience and ease of understanding, the following discussion describes the lever systems in terms of human limbs. However it will be appreciated that the same lever systems can be applied to other species as well.

As indicated above, in one aspect, the invention is a kit for constructing biomechanical models of three lever systems, namely first class lever systems (e.g., the head nodding on the neck), second class lever systems (e.g., foot and ankle toe rise), and third class lever systems (e.g., flexing the arm). As defined herein, the term "first class lever system" refers to a lever system in which the fulcrum (joint) is located between the force (muscle) and the weight (resistance). As defined herein, the term "second class lever system" refers to a lever system in which the weight (resistance) is located between the fulcrum (joint) and the force (muscle). As defined herein, the term "third class lever system" refers to a lever system in which the force (muscle) is located between the fulcrum (joint) and the weight (resistance). As defined herein, a "lever" is a rigid shaft (such as a bone) capable of turning about a pivot point, called a fulcrum, and transferring a force applied at one point along the lever to a weight placed at some other point along the lever. As used herein, the term "lever assembly" is defined as a combination of levers joined together at one or more pivot points and includes first class lever systems, second class lever systems, and third class lever systems.

Figure 1:
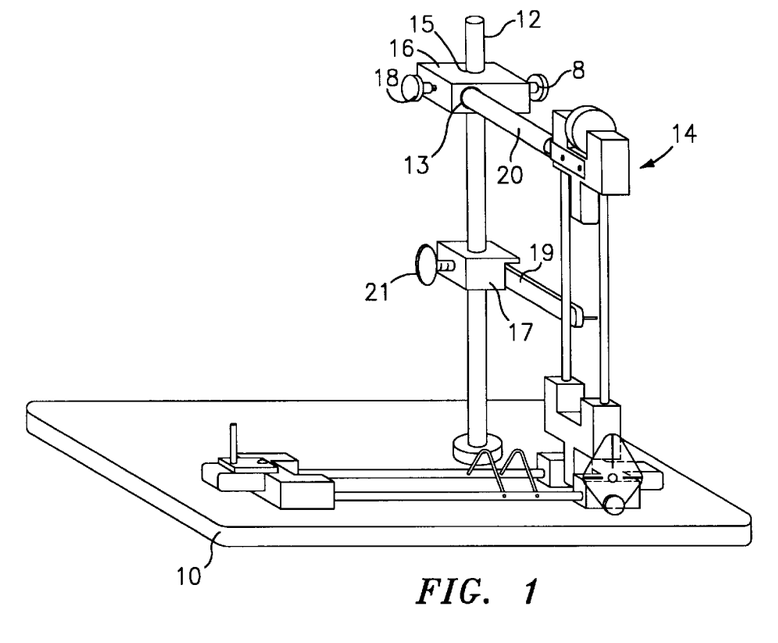
FIG. 1 is a schematic diagram of an embodiment of the invention showing operation of a third class lever system.

As indicated above, the invention is a kit that includes a base and support structure, at least one lever assembly, and at least one cord assembly. The lever assembly or assemblies included with the kit of the invention include first class lever assemblies, second class lever assemblies, third class lever assemblies, or a combination of these. FIG. 1 shows the kit of the invention assembled to demonstrate the biomechanical workings of a third class lever system, such as the human arm.

As shown in FIG. 1, a support structure 12 is mounted on a base 10 and acts as a support for the lever assembly (hereinafter referred to as arm assembly 14). The arm assembly 14 is attached to the support structure 12 by a mounting rod 20 that slides into a hole 13 on an attachment block 16 and is secured by nuts 18 or equivalent detachable securing means. The attachment block 16 is mounted on the support structure 12 through a hole 15 and secured in position by nut 8. The adjustable nature of the holes 13, 15 in the mounting block 16 permit the user to accommodate the height, angle, and position of the arm assembly 14 on the base 10 according to the dimensions of the arm assembly, the distance between the arm assembly and the support structure, and the desired angle of the arm assembly.

A holding attachment 17 may also be secured to the support structure 12 by a nut 21. As described in more detail below, the holding attachment 17 includes an adjustable attaching arm 19 that may be used to secure the handle portion of the cord assembly and hold the arm assembly in a "flexed" position. The adjustable nature of the holding attachment 17 permits the user to hold the "flexed" arm assembly in any selected position.

Figure 2:
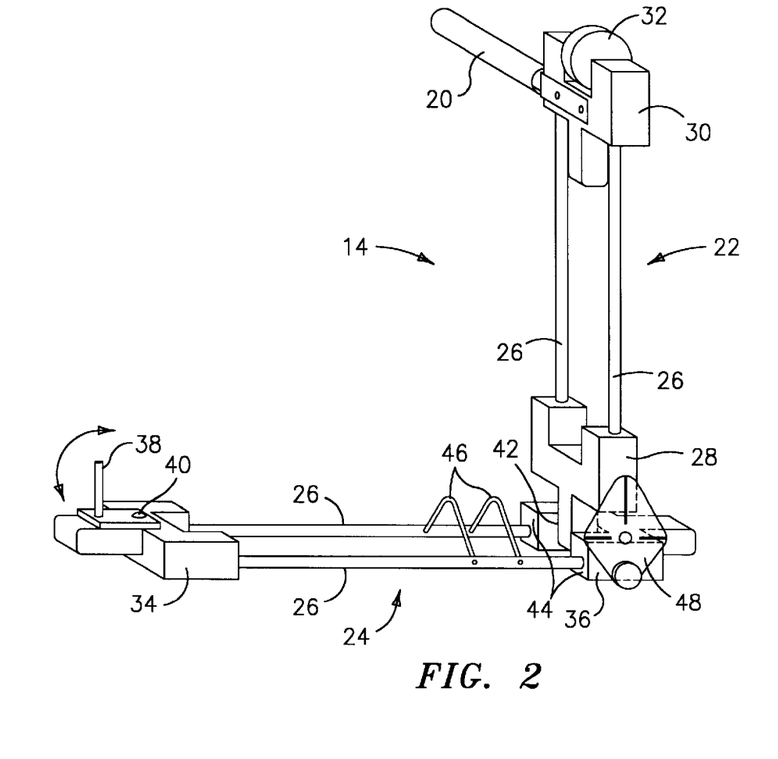
FIG. 2 is a schematic diagram of the third class lever system assembly of the embodiment shown in FIG. 1.

FIG. 2 shows the arm assembly 14 in greater detail. The arm assembly 14 includes an upper arm member 22 and a lower arm member 24 that are joined together at a pivot point 42. In one embodiment, the upper arm member 22 includes a pair of rails 26 in which the ends of each rail are mounted in upper and lower Y-blocks 30,28. As shown in FIG. 2, the upper Y-block includes a pulley 32 and the mounting rod 20 for mounting the arm assembly 14 to the support structure 12. The rails 26 are mounted in each upper and lower Y-block so that they are parallel to each other for best support of the resistance, although other configurations are possible. The lower arm member 24 also includes rails 26 in which the ends of each rail are mounted in front and rear Y-blocks 34,36. Like the upper arm member, the rails 26 of the lower arm member are mounted in each front and rear Y-block so that they are parallel to each other for best support of the resistance, although other configurations are possible. The front Y-block 34 includes a weight attachment pin 38 which is used for attachment of weights (resistance) during operation of the model. The weight attachment pin 38 is preferably pivotable around the attaching screw 40 so that different distances between the resistance and the pivot point 42 may be selected.

The components of the upper and lower arm members may be made from any suitable constructive material, such as wood, plastic, metal, thermoplastic composite and the like. Additionally, although the arm assembly is shown in FIGS. 1 and 2 as a combination of rails and Y-blocks, other configurations of the components of the assembly are possible, such as solid or hollow beams. Alternatively, the Y-blocks and rails of the upper and lower arm members may be formed from a single piece of material, such as wood, plastic, metal, thermoplastic composite, and the like. As explained in more detail below, the length of the upper and lower arm members may be manufactured in a fixed length, or may adjustable to demonstrate how the length of these members affects force requirements.

Figure 7:
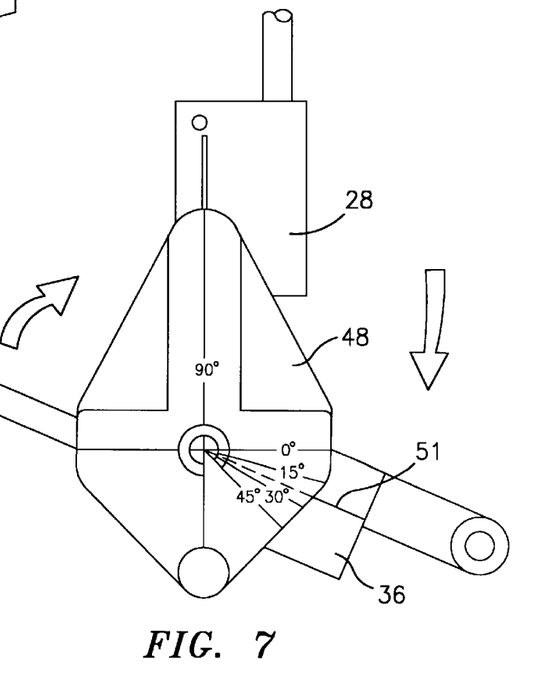
FIG. 7 is a schematic diagram of the angle measuring device of the invention.

As mentioned above, the upper arm member 22 and the lower arm member 26 are jointed at a pivot point 42. As shown in FIG. 2, the tongue portion of the lower Y-block 28 fits between the crossmembers 44 of the rear Y-block 36 so that the front Y-block 34 will follow an arcuate path as it is raised into a flexed position. Anchoring hooks 46 are mounted between the rails 26 of the lower arm member to serve as attachment points for the cord assembly as described in more detail below. An angle measuring device, such as a protractor 48, is secured at the pivot point to measure the relative angle between the upper arm member 22 and the lower arm member 24 as the lower arm member moves. As best seen in FIG. 7, the rear Y-block of the lower arm member includes a score mark 51, and when used in conjunction with the protractor 48, permits precise angular adjustment of the lower arm member as the model operates. Although shown as a protractor in FIGS. 1 and 2, alternative angle measuring devices, such as electronic angle measuring devices, may also be implemented.

Figure 3:
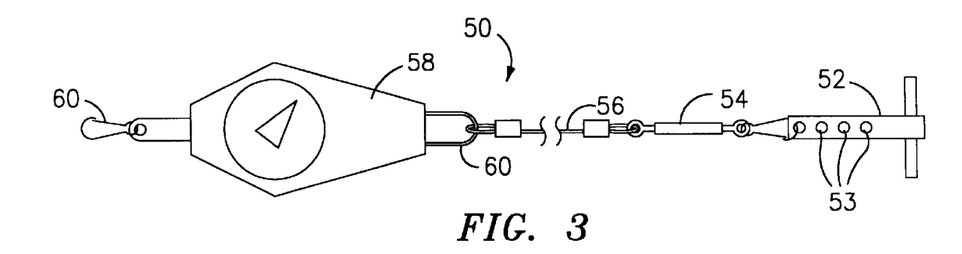
FIG. 3 is a schematic diagram of the cord assembly of the invention.

FIG. 3 shows the cord assembly of the invention 50 that is used to actuate the biomechanical model. The cord assembly 50 includes a handle 52 which is attached to a length adjusting device such as an adjusting turnbuckle 54. In one embodiment, the handle portion 52 includes holes 53 for attachment to the attaching arm 19 as described in more detail in FIG. 4. The adjusting turnbuckle 54 is in turn attached to a cord 56, which is attached to a weight measuring device 58. The cord 56 may be any nonstreching material such as conventional fiber cord, metal cable, or wire. As shown in FIG. 3, the resistance measuring device 58 can be a mechanical scale; however one skilled in the art will appreciate that other resistance measuring devices may be substituted, for example an electronic scale, or a force transducer for measurement of force by a computer or other electronic readout device. Alternatively, the weight measuring device may be omitted from the cord assembly 50 to demonstrate qualitatively how the lever systems operate. Attaching hooks 60 are secured to the weight measuring device 58 so that it may be attached to the cord 56 and the anchoring hooks 46.

Figure 4:
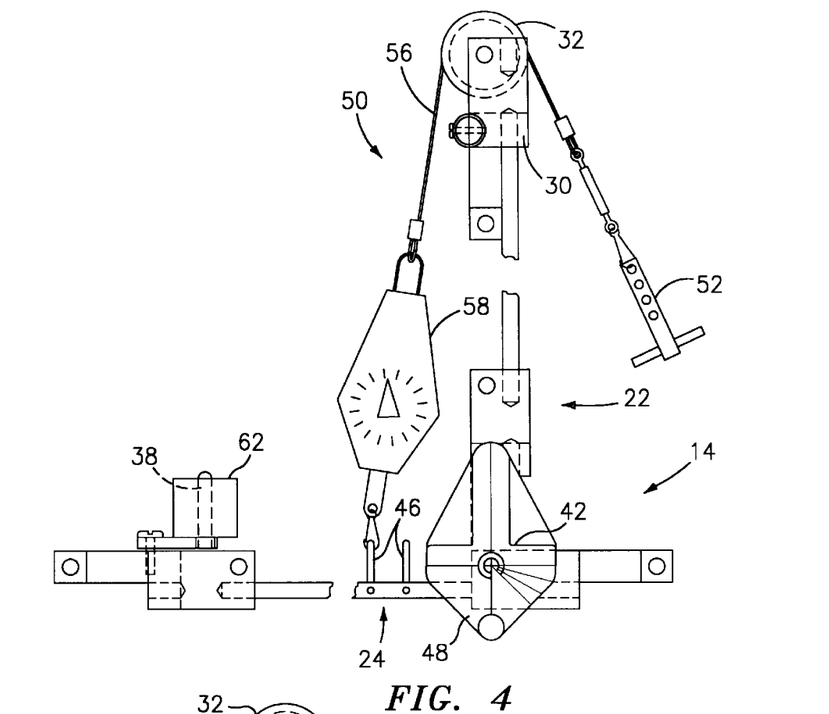
FIG. 4 is a schematic diagram of the third class lever system embodiment of the invention in a rest position.

FIG. 4 shows the arm embodiment of the invention in a "rest" position. The upper arm member 22 is preferably maintained in a perpendicular arrangement with respect to the base (not shown), and the lower arm member 24, in the rest position, is parallel to the base as measured by the protractor 48. As shown in FIG. 4, the weight measuring device 58 of the cord assembly 50 is attached to the lower arm member 24 by anchoring hooks 46, and the cord 56 is positioned over the pulley 32 on the upper Y-block 30. A weight 62 may be placed on the weight attachment pin 38 to add resistance during operation of the model. Prior to actuation, the weight measuring device is preferably set to zero.

Figure 5:
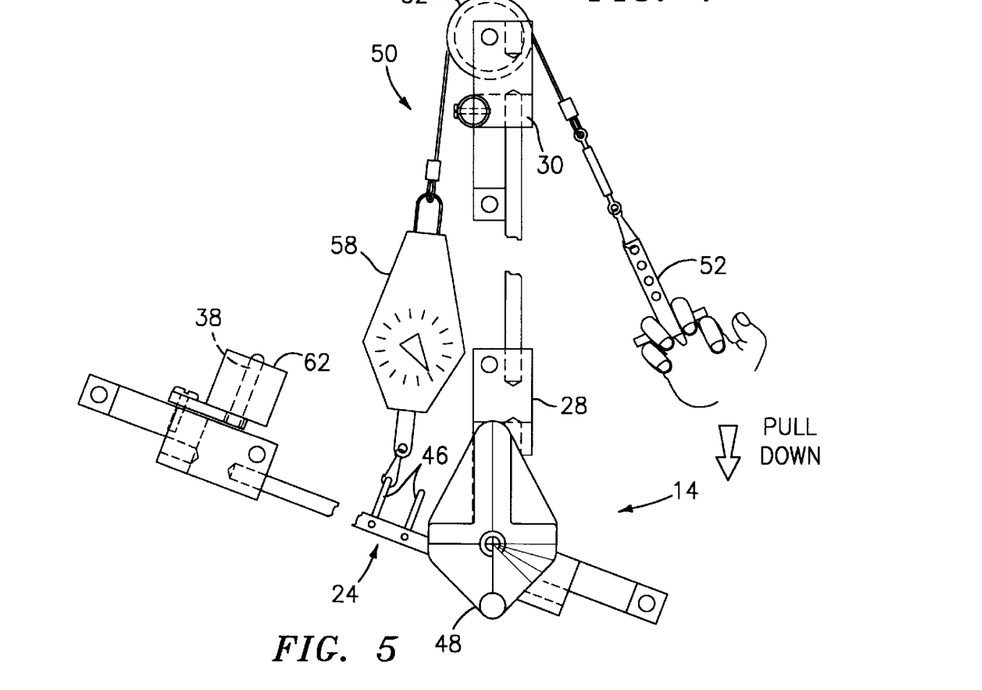
FIG. 5 is a schematic diagram of the third class lever system embodiment of the invention in a "flexed" position.

Referring now to FIG. 5, the arm embodiment of the invention is shown in a "flexed" position. As the handle 52 is pulled down, tension is applied through the cord 56, over the pulley 32, and through the weight measuring device 58 so that the lower arm member 24 achieves the desired angle of inclination relative to the base as measured by the protractor 48 (see FIG. 7). As shown in FIGS. 4 and 5, during application of tension, the lower arm member 24 pivots at the pivot point 42 SO that the front Y-block 34 of the lower arm member 24 follows an arcuate path as it is raised to the desired angle of inclination.

Figure 6:
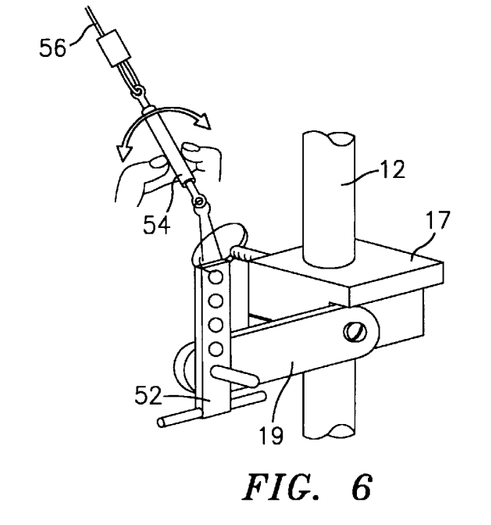
FIG. 6 is a schematic diagram of the adjustment device of the invention.

In order to take measurements of the force necessary to maintain the biomechanical model in the flexed position, the lower arm member must be maintained in a flexed position while readings are taken. FIG. 6 shows the adjustment device 54 and handle 52 of the invention in more detail. As mentioned above, the handle 52 includes holes 53 for attachment to the attaching arm 19. A plurality of holes are preferably included in the handle 52 so that the pin 60 of the attaching arm 19 may be fitted through a selected hole 53 in the handle 52 to allow for coarse adjustment of the angle of inclination of the lower arm member 24. Fine adjustment of the angle of inclination may be made by adjusting the adjusting turnbuckle 54 as shown in FIG. 6 in combination with reading the protractor. By adjusting the adjusting turnbuckle 54, the score mark 51 on the right Y-block may be matched to the exact markings on the protractor as shown in FIG. 7, and precise angular positioning of the lower arm member may be achieved. Once the lower arm member is positioned at the desired angle, the amount of resistance may then be read from the weight measuring device 58.

The user may choose to perform static or dynamic simulations of skeletomuscular function. Static measurements are taken with the model fixed in one position as described above. Dynamic measurements may be taken through a range of motion for the simulated joint. For example, the device may be attached to a computer and sensor apparatus to measure the force required to actuate the model as the arm is moved along its arcuate path. A motor may be included to controllably move the arm assembly while force readings are taken. Thus, the force required may be measured continuously as a function of angular displacement.

The user may adjust several parameters of the model to illustrate how these various parameters affect the amount of force required to move the lower arm member or maintain it at a desired position. As shown in FIG. 2, the weight attachment pin 38 may be rotated around the adjusting screw 40 to place the weight 62 closer or farther from the upper arm member. In general, if the weight attachment pin 38 is positioned closer to the pivot point 42, the weight 62 is positioned closer to the upper arm member and less force needs to be applied to move the lower arm member. Alternatively, the weight attachment pin 38 may be moved 180° to position the weight 62 farther from the pivot point 42 so that more force is required. In addition, as mentioned above, assembly of the model using shorter or longer upper and lower arm members also demonstrates how these changes affect required applied force. The anchoring hooks 46 may be positioned at any position along the rails 26 of the lower arm member 24. In general, at this point, the closer the attachment results in a shorter force arm,.and a correspondingly greater amount of force is required to move or support a given weight.

Various other adjustments can be made to the model to investigate the biomechanics of lever action. Some of these adjustments include adding or removing weights from the model to alter the resistance forces against which the model works; and varying the initial angle relative to gravity at which the joint operates to investigate the rotational and translational components. The angle of the upper member may be varied to alter the rotational and translational forced produced by pulling on the cord assembly. Additional variations are known to those of skill in the art.

The third class lever system models may be reconfigured to study comparative kinesiology of non-human species with homologous elements such as fins or paws where dimensions and arrangements are different.

Figure 8:
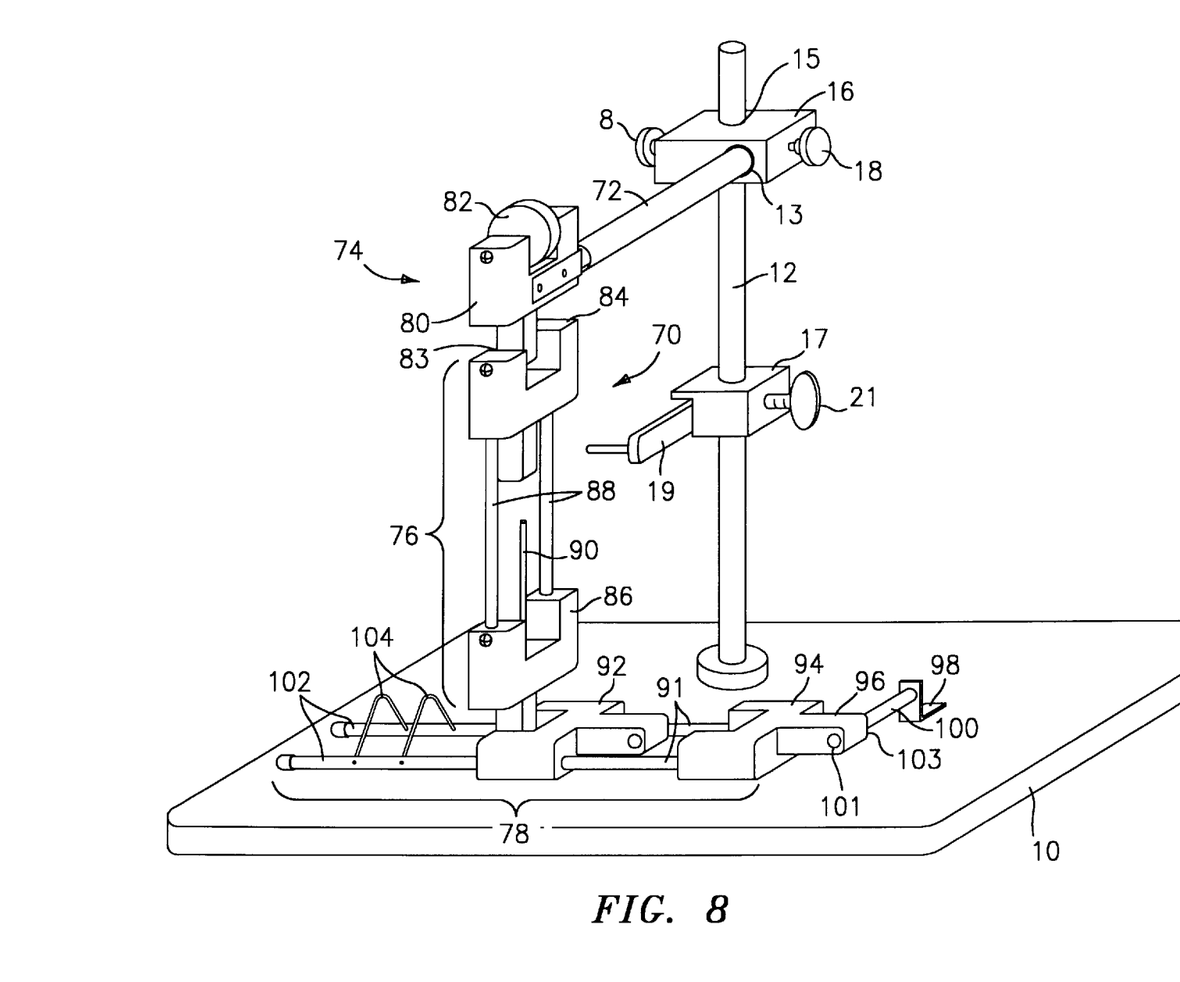
FIG. 8 is a schematic diagram of an embodiment of the invention showing operation of a second class lever system.

FIG. 8 shows the kit of the invention assembled to demonstrate the biomechanical workings of a second class lever system, such as the human leg and foot. For simplicity, in FIGS. 1 and 8, like numerals refer to like parts. This particular embodiment includes a support structure 12 secured perpendicularly to a base 10. A lever assembly (hereinafter referred to as leg and foot assembly 70) is attached to the support structure 12 by a mounting rod 72 that slides into a hole 13 on an attachment block 16 and is secured by nuts 18 or equivalent detachable securing means. The attachment block 16 is mounted on the support structure 12 through a hole 15 and secured in position by a nut 8. The adjustable nature of the holes 13, 15 in the mounting block 16 permit the user to accommodate the height, angle, and position of the leg and foot 70 on the base 10 according to the dimensions of the leg and foot assembly 70, the distance between the leg and foot assembly 70 and the support structure 12, and the desired angle of the leg and foot assembly 70.

A holding attachment 17 may also be secured to the support structure by a nut 21. As described earlier, the holding attachment 17 includes an attaching arm 19 that may be used to secure the handle portion of the cord assembly and hold the leg and foot assembly in a "dorsi flexed" position. The adjustable nature of the holding attachment 17 permits the user to hold the "flexed" leg and foot assembly in any selected position.

As shown in FIG. 8, the leg and foot assembly 70 includes an upper leg member 74, a lower leg member 76, and a foot member 78. The upper leg member 74 consists of a Y-block 80 and a pulley 82 attached to the top of the Y-block 80. The tongue of the Y-block 80 forms a pivot point 83 with the upper Y-block 84 of the lower leg member 76 so that the pivot point 83 mimics the knee joint in the human leg. The lower leg member 76 consists of an upper Y-block 84, a lower Y-block 86, and rails 88 that join the upper and lower Y-blocks in a manner similar to the upper and lower arm members described earlier. The lower Y-block 86 includes a weight attachment pin 90 located approximately between the rails 86, and a tongue portion that forms a pivot point with the left Y-block 92 of the foot member 78. The lower leg member 76 may also include an angle measuring device (seen in FIG. 9) such as a protractor, to measure the angle between the lower leg member 76 and the foot member 78.

The foot member 78 includes a left Y-block 92, a right Y-block 94, and rails 91 that joint the left and right Y-blocks. The right Y-block 94 includes a tongue portion 96 with a hole 101. The hole 101 receives the pin 100 of the mounting bracket 98 and forms a pivot point 103 that mimics the toes of the human foot. The left Y-block includes a pair of rails 102 with attachment hooks 104 positioned therebetween that provide attachment points for the cord assembly 50.

Like the third class lever assembly, the second class lever assembly is shown as a combination of Y-blocks and rails. However, solid or hollow beams may also be implemented. Materials used to construct the members include wood, plastic, metal, thermoplastic composite, and the like.

Figure 9:
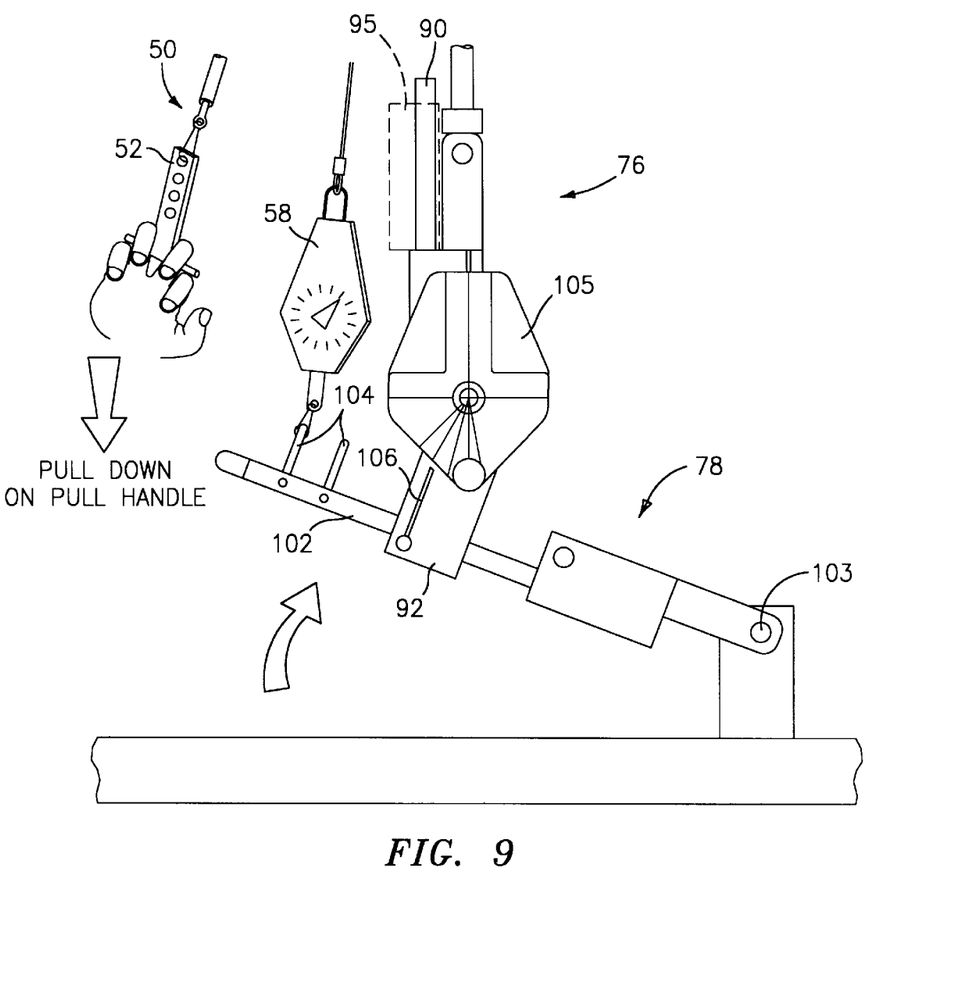
FIG. 9 is a schematic diagram of the second class lever system embodiment of the invention in a "dorsi flexed" position.

The leg and foot assembly 70 illustrates the biomechanics involved when the calf muscles are contracted. As shown in FIG. 9, the weight measuring device 58 of the cord assembly 50 is attached to the rails 102 by attachment hooks 104, and the cord assembly 50 is mounted over the pulley 82. weight(s) (shown in phantom at 95) may be added to the weight attachment pin 90 to provide added resistance during operation of the model.

In the rest position, the foot member 78 of the leg and foot assembly rests on the base 10 as shown in FIG. 8. As shown in FIG. 9, as the handle 52 is pulled downward, tension is developed in the cord assembly 50, and the foot member 78 is pivoted at the pivot point 103 so that the "heel" portion of the foot member is raised. Simultaneously, the knee pivot point 83 is also actuated to mimic the action of the human knee. The angle the foot member 78 is raised may be measured by the angle measuring device 105 in conjunction with the score mark 106 on the left Y-block 92. Like the third class lever system, the handle 52 may be secured to the attaching arm 19 by fitting the pin 60 through a hole 53 to allow for coarse adjustment of the angle of inclination of the foot member. Fine adjustment of the angle of inclination may be made by adjusting the adjusting turnbuckle 54 in combination with reading the protractor. Once the foot member is positioned at the desired angle, the amount of resistance may then be read from the weight measuring device 58.

The user may choose to perform static or dynamic simulations of skeletomuscular leg and foot function. Static measurements are taken with the model fixed in one position. Dynamic measurements are taken through a range of motion for the simulated joint. For example, the device may also be attached to a computer and force transducer apparatus to measure the force required to actuate the mode as the arm is moved along its arcuate path. A motor may be included to controllably move the arm assembly while force readings are taken. Thus, the force required may be measured continuously as a function of angular displacement.

Like the third class lever system, the second class lever system model can be adjusted to assess how such adjustments change the tension required to move the weight resistance. The cord assembly may be attached to the foot member by positioning the attachment hooks 104 at various positions along rails 102. In general, as the attachment point is moved farther from the left Y-block 92, less force is required to raise the foot member to the desired angle of inclination. Similarly, lengthening the rails 91 of the foot member permits a greater distance between the pivot point 103 and the attachment hooks 104 and correspondingly less force will be required to raise the foot member. In addition, various other adjustments can be made to the model to investigate the biomechanics of lever action. Some of these adjustments include adding or removing weights from the model to alter the resistance forces against which the model works, and varying the initial angle relative to gravity at which the joint operates to investigate the rotational and translational components.

As with the third class lever system, the second class lever system may be reconfigured to study comparative kinesiology of non-human species with homologous elements such as fins or paws where dimensions and arrangements are different.

Figure 10:
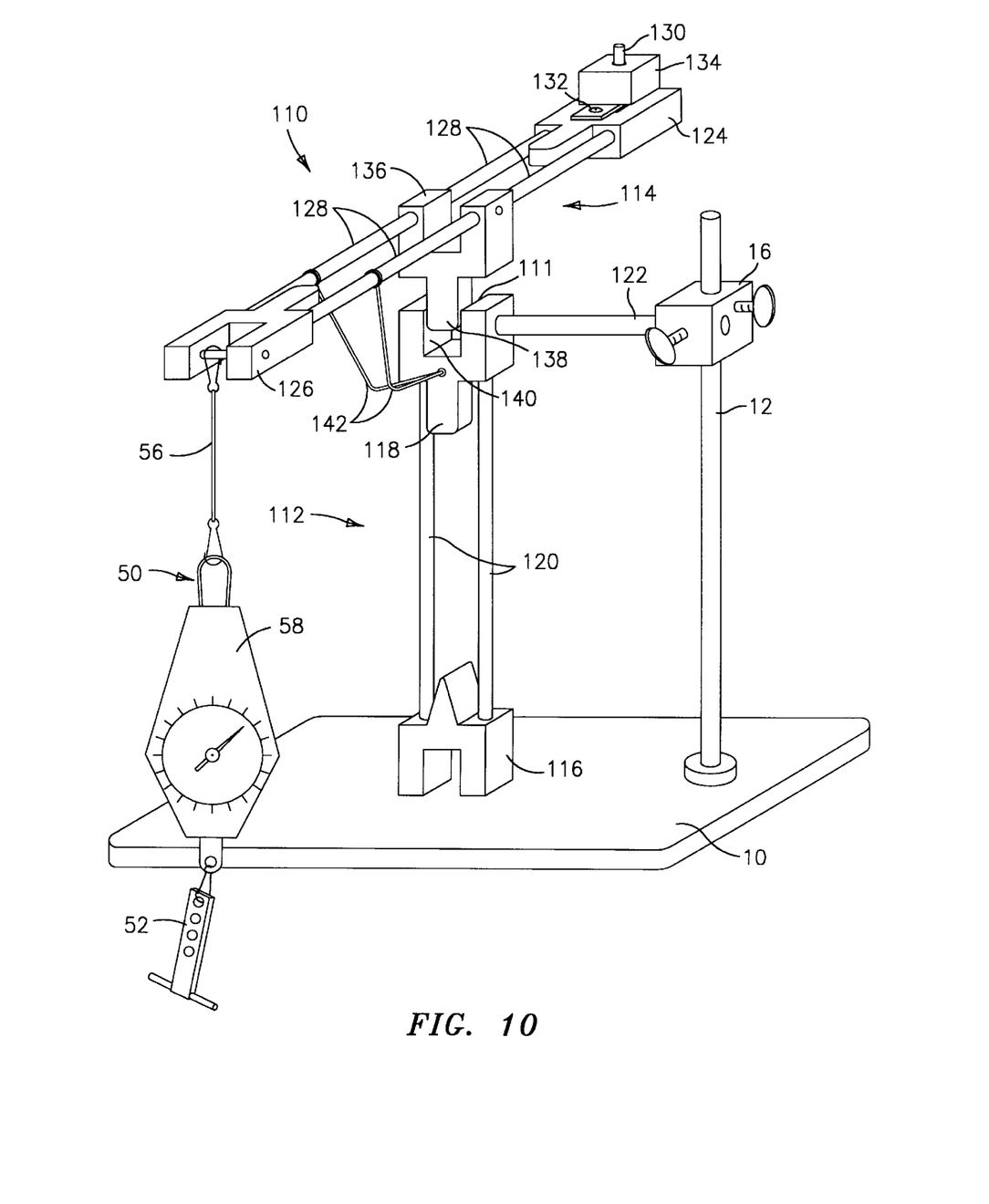
FIG. 10 is a schematic diagram of an embodiment of the invention showing operation of a first class lever system.

FIG. 10 illustrates an embodiment of a first class lever system made using the kit of the invention. The first class lever assembly 110 shown in FIG. 10 is attached to a support structure 12 by an attachment block 16 and includes an upright member 112 and a transverse member 114 which are attached at a pivot point 111. The upright member 112 includes a pair of rails 120 mounted between a lower Y-block 116 and an upper Y-block 118. The upper Y-block 118 includes a mounting rod 122 which serves to secure the first class lever assembly 110 to the base and support structure by way of the hole 13 located in the attachment block 16 (best viewed in FIGS. 1 and 8). The transverse member 114 includes a pair of rails 128 mounted between a front Y-block 124 and a rear Y-block 126. The front Y-block 124 includes a weight attachment pin 130 which is secured by an attaching screw 132. The weight attachment pin is rotatable around the attaching screw 132 to allow the user to set the weight 134 at different distances from the pivot point 111.

Mounted approximately in the center of the rails 128 is a pivoting Y-block 136 which connects the transverse member 114 with the upright member 112. The tongue portion 138 of the pivoting Y-block 136 fits between the groove 140 of the upper Y-block 118 and forms pivot point 111 that allows the transverse member 114 to move back and forth in an arcuate path within a plane perpendicular to the base 10. In an alternative embodiment, the pairs of rails 128 located between the front Y-block 124 and the pivoting Y-block, and the pairs of rails located between the rear Y-block 126 and the pivoting Y-block may be different lengths to generate different torques when forces are applied.

The cord assembly 50 is attached to the rear Y-block by hooks or other conventional attaching means. In the rest position, a weight 124 is positioned on the weight attachment pin 130 and forces the front Y-block 124 below the rear Y-block 126. A pair of catch chains 142 are attached to the rails located between the rear Y-block 126 and the pivoting Y-block 136 and the upper Y-block 118 to prevent the transverse member 114 from swinging down uncontrollably under the influence of the weight 134. During actuation of the model, the handle 52 is pulled downward, and tension is applied through the cord 56 and weight measuring device 58 so that the rear Y-block is raised along an arcuate path to a point above its resting point. The force required to raise the weight can be measured by the weight measuring device 58. The first class lever system may also employ an angle measuring device such as a protractor, and an attachment point for the handle of the cord assembly.

The user may choose to do static or dynamic simulations of the first class lever system in a manner analogous to the third and second class lever systems described earlier.

The first class lever system model can be adjusted to assess how such adjustments change the tension required to move the weight resistance. As mentioned above, the pairs of rails 128 located between the front Y-block 124 and the pivoting Y-block, and the pairs of rails located between the rear Y-block 126 and the pivoting Y-block may be different lengths to generate different torque forces. In addition, adding or removing weights from the model alters the resistance forces against which the model works.

This mechanical device allows the user to simulate the function of moveable joints of the skeletomuscular system. The invention can be used in a variety of learning situations including demonstrations in lectures and seminars, explorations in laboratories by individual students and groups, or independent study by students using a self-guiding curriculum. The invention can also be used in a variety of courses, disciplines and levels of study. For example, with the appropriate curriculum, the invention can find applications in junior high school general, physical, or life science courses, high school physics, health and biology courses, undergraduate courses in vertebrate biology and human anatomy and physiology, and graduate or professional training in biomechanical engineering, physical therapy, medicine, veterinary medicine, and the like. In addition, the invention can be used by physicians, physical therapists, veterinarians, and other health care professionals to demonstrate exercises in a rehabilitation program.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims.

What is claimed is:

1. A kit for constructing a biomechanical model of a lever system selected from a first class lever system, a second class lever system, and a third class lever system, comprising:

a base;

a support structure attachable to said base;

at least one lever assembly attachable to said support structure;

at least one cord assembly attachable to said lever assembly;

and wherein said at least one lever assembly further comprises an angle measuring device.

2. The kit of claim 1, wherein said at least one lever assembly comprises a third class lever assembly, comprising:

an upper member having a first end and a second end;

a lower member having a first end and a second end, said first end of said upper member pivotably attached to said first end of said lower member such that said second end of said lower member follows an arcuate path; and a pulley attached to said second end of said upper member.

3. The kit of claim 1, wherein said at least one lever assembly comprises a second class lever assembly, comprising:

an upper member having a first end and a second end;

a lower member having a first end and a second end, said first end of said upper member pivotably attached to said first end of said lower member;

a foot member having a first end and a second end, said first end of said foot member pivotably attached to said base, said second end of said lower member pivotably attached to said foot member; and a pulley attached to said second end of said upper member.

4. The kit of claim 1, wherein said at least one lever assembly comprises a first class lever assembly, comprising a transverse member having a first end and a second end;

an upright member having a first end and a second end, said transverse member pivotably attached to said first end of said upright member so that said transverse member moves in an arcuate path along a plane perpendicular to said base; and a cord assembly attached to said second end of said transverse member.

5. The kit of claim 1, wherein said angle measuring device is a protractor.

6. The kit of claim 1, further comprising at least one resistance force removably attachable to said at least one lever assembly.

7. The kit of claim 1, wherein said at least one cord assembly comprises a resistance measuring device.

8. The kit of claim 1, further comprising a holding attachment, wherein an end of said cord assembly is attachable to said holding attachment.

9. A biomechanical model of a third class lever system, comprising:

a base;

a support structure attached to said base;

a third class lever system assembly attached to said support structure, comprising:

an upper member having a first end and a second end;

a lower member having a first end and a second end, said first end of said upper member pivotably attached to said first end of said lower member such that said second end of said lower member follows an arcuate path; and a pulley attached to said second end of said upper member; and a cord assembly attached to said lower member and threaded over said pulley;

wherein pulling force applied to said cord assembly causes said second end of said lower member to follow an arcuate path.

10. The biomechanical model of claim 9, further comprising an angle measuring device.

11. The biomechanical model of claim 9, further comprising at least one resistance force removably attachable to said lower member.

12. The biomechanical model of claim 9, wherein said cord assembly comprises a resistance measuring device.

13. The biomechanical model of claim 9, further comprising a holding attachment wherein an end of said cord assembly is attachable to said holding attachment.

14. The biomechanical model of claim 9, wherein said cord assembly comprises an adjustment device.

15. A biomechanical model of a second class lever system, comprising:

a base;

a support structure attached to said base;

a second class lever assembly attached to said support structure, comprising an upper member having a first end and a second end;

a lower member having a first end and a second end, said first end of said upper member pivotably attached to said first end of said lower member;

a foot member having a first end and a second end, said first end of said foot member pivotably attached to said base, said second end of said lower member pivotably attached to said foot member; and a pulley attached to said second end of said upper member; and a cord assembly attached to said second end of said foot member and threaded over said pulley;

wherein pulling force applied to said cord assembly causes said second end of said foot member to elevate with respect to said base.

16. The biomechanical model of claim 15, further comprising an angle measuring device.

17. The biomechanical model of claim 15, further comprising at least one resistance force removably attachable to said lower member.

18. The biomechanical model of claim 16, wherein said cord assembly comprises a resistance measuring device.

19. The biomechanical model of claim 15, further comprising a holding attachment wherein an end of said cord assembly is attachable to said holding attachment.

20. The biomechanical model of claim 15, wherein said cord assembly comprises an adjustment device.

21. A biomechanical model of a first class lever system, comprising:

a base;

a support structure attached to said base;

a first class lever assembly attached to said support structure, comprising a transverse member having a first end and a second end;

an upright member having a first end and a second end, said transverse member pivotably attached to said first end of said upright member so that said transverse member moves in an arcuate path along a plane perpendicular to said base; and a cord assembly attached to said second end of said transverse member;

wherein pulling force applied to said cord assembly causes said first end of said transverse member to elevate with respect to said base.

22. The biomechanical model of claim 15, further comprising at least one resistance force removably attachable to said lower member.

23. The biomechanical model of claim 15, wherein said cord assembly comprises a resistance measuring device.

* * * * *